United States Patent
Hirai

(10) Patent No.: US 6,819,786 B2
(45) Date of Patent: Nov. 16, 2004

(54) IMAGE PROCESSING APPARATUS

(75) Inventor: Akira Hirai, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 604 days.

(21) Appl. No.: 09/825,993

(22) Filed: Apr. 5, 2001

(65) Prior Publication Data

US 2001/0033678 A1 Oct. 25, 2001

(30) Foreign Application Priority Data

Apr. 6, 2000 (JP) ........................ 2000/105373
Feb. 13, 2001 (JP) ........................ 2001/035536

(51) Int. Cl.[7] .............................................. G06K 9/00
(52) U.S. Cl. ...................................... 382/132; 382/270
(58) Field of Search ................................ 382/128–134, 382/181, 312, 141, 270, 271–273; 250/311, 582, 370.09; 356/456; 378/18, 37, 95, 205; 600/160, 420, 424, 425, 431, 476

(56) References Cited

U.S. PATENT DOCUMENTS

| | | | |
|---|---|---|---|
| 4,810,881 A | | 3/1989 | Berger et al. ............ 250/370.01 |
| 4,935,820 A | | 6/1990 | Patel et al. .................. 358/302 |
| 5,079,698 A | * | 1/1992 | Grenier et al. ............... 382/128 |
| 5,132,539 A | | 7/1992 | Kwasnick et al. ....... 250/361 R |
| 5,151,596 A | * | 9/1992 | Saotome ..................... 250/585 |
| 5,359,513 A | * | 10/1994 | Kano et al. .................. 382/128 |
| 5,381,014 A | | 1/1995 | Jeromin et al. ......... 250/370.09 |
| 5,396,072 A | | 3/1995 | Schiebel et al. ........ 250/370.09 |
| 5,418,377 A | | 5/1995 | Tran et al. ................ 250/483.1 |
| 5,465,718 A | * | 11/1995 | Hochman et al. ............ 600/420 |
| 5,544,157 A | * | 8/1996 | Wenstrup et al. ............. 378/18 |
| 5,712,890 A | * | 1/1998 | Spivey et al. .................. 378/37 |
| 5,768,333 A | * | 6/1998 | Abdel-Mottaleb ............ 378/37 |
| 5,784,162 A | * | 7/1998 | Cabib et al. ................. 356/456 |
| 5,878,746 A | * | 3/1999 | Lemelson et al. ........... 600/407 |
| 5,974,165 A | * | 10/1999 | Giger et al. ................. 382/132 |
| 5,981,968 A | * | 11/1999 | Nakazawa ................... 250/587 |
| 5,995,645 A | * | 11/1999 | Soenksen et al. ........... 382/133 |
| 6,034,794 A | * | 3/2000 | Suganuma ................... 358/518 |
| 6,236,467 B1 | * | 5/2001 | Yamamoto ................... 358/442 |
| 6,470,071 B1 | * | 10/2002 | Baertsch et al. .............. 378/62 |
| 6,542,579 B1 | * | 4/2003 | Takasawa .................... 378/165 |

FOREIGN PATENT DOCUMENTS

JP 2004545 1/1990 .............. B41J/2/44

OTHER PUBLICATIONS

Wagner et al., "Effects of Scatter in Dual Energy Imaging: An Alternative Analysis", IEEE Transaction on Medical Imaging, Sept. 1989, pp. 236–244.*

Shalev et al, "On–Line Verification of Radiation Treatment Portals", IEEE Medicine & Biology Society, 1988, pp. 382–383.*

* cited by examiner

Primary Examiner—Yon J. Couso
(74) Attorney, Agent, or Firm—Fitzpatrick, Cella, Harper & Scinto

(57) ABSTRACT

A system for performing gain correction of the image of an object obtained by image capture. A first white image is obtained by image capture at a first time with no object present, and a second white image is obtained by image capture at a second time later than the first image, with no object present. The first and second white images are then compared to determine if they meet predetermined criteria. If the predetermined criteria is met, a third white image is provided based on the comparison of the first and second white images, and the image of the object obtained by image capture is gain corrected based on the third white image.

9 Claims, 9 Drawing Sheets

IMAGE PROCESSING APPARATUS

BACKGROUND OF THE INVENTION

1. Field of the Invention

The present invention relates to an image processing apparatus, an imaging device, an image processing system, an image processing method and a computer-readable storage medium storing program code for the image processing method, for performing a gain correction process to make uniform the gain of pixels forming an image which is obtained through radiation imaging using an image pickup device composed of a plurality of pixels.

2. Description of the Related Art

In radiation imaging, an object is irradiated with radiation, and the intensity distribution of radiation transmitted through the object is detected.

Specifically, the following method for radiation imaging is widely used.

A combination of a "fluorescent screen" (or a "intensifying screen"), which emits fluorescence in response to radiation, and a silver film is set up with an object. The fluorescent screen and silver film and the object are then irradiated. The fluorescent screen converts radiation into visible light and a latent image of the object is formed on the sliver film. The silver film having the latent image of the object is then subjected to a chemical process. The silver film then presents a visible image (a radiation image of the object).

A radiation image thus obtained is an analog photograph, and is used for diagnostic imaging and examination.

Computed radiographic apparatuses (hereinafter referred to as "CR" apparatuses) using an imaging plate (hereinafter referred to as "IP") with photostimulable phosphor applied thereon are now in use.

The CR apparatus emits photostimulated luminescence when the IP primarily excited by the irradiation of radiation is subjected to a secondary excitation by visible light such as a red laser. The photostimulated luminescence is detected by a photosensor such as a photomultiplier. Image data (radiation image data) thus obtained is used to output a visible image on a photosensitive material or a cathode ray tube.

The above-mentioned CR apparatus, which is a digital imaging apparatus, may be called an indirect digital imaging apparatus because it requires an imaging process of reading in response to a secondary excitation.

The CR apparatus is an "indirect imaging apparatus" because a captured image (through radiation imaging) is not instantly presented at the moment the image is taken. This is also the case as with a technique in which a radiation image is taken as an analog photograph.

There have been recently developed apparatuses which capture a digital radiation image using photoelectric conversion means (image pickup devices such as charge-coupled devices) composed of a matrix of pixels, each being a tiny photoelectric converter or switching element.

Radiation imaging apparatuses having a charge-coupled device or two-dimensional amorphous silicon image pickup device with phosphor deposited thereon are disclosed in, for example, U.S. Pat. Nos. 5,418,377, 5,396,072, 5,381,014, 5,132,539, and 4,810,881.

Since these apparatuses instantly display a captured radiation image, they are called a direct digital imaging apparatus.

The advantage of the direct or indirect digital imaging apparatus over the analog photographing technique is due to filmless operation, a large amount of acquired information through image processing and ease of building a database.

The advantage of the direct digital imaging apparatus over the indirect digital imaging apparatus is due to immediacy. Because of its immediacy, a radiation image through radiation imaging is displayed on the spot. In the clinic field typically in need of urgency, immediacy is important.

In the direct digital imaging apparatus using the charge-coupled image pickup device, the gain of each pixel forming the image pickup device is uniform. To produce a uniform output from the image pickup device with respect to the input image, gain correction is required on a pixel by pixel basis.

Image capturing for gain correction is called calibration. A user typically performs calibration on a regular basis.

Specifically, variations in gain in pixels in the image pickup device change with time under the influence of operational conditions. To acquire a satisfactory output image, a proper calibration must be performed in response to operational conditions of the image pickup device at startup.

During calibration, the imaging device irradiates an entire effective imaging area with an object (a subject) removed. The image thus obtained (hereinafter referred to as a "white image" or a "gain image") is stored. Thereafter, actual radiation imaging (clinical imaging) is performed. Specifically, the object is set up and radiation imaging (clinical imaging) is performed. Gain variations of the image thus obtained (a clinical image) are corrected using the prestored white image.

However, if there is any fault in the white image resulting from calibration in the conventional digital imaging apparatus, that fault migrates to all subsequently taken images until a subsequent calibration.

For example, when the irradiation of an entire image field with the radiation of the imaging apparatus is limited through a radiation diaphragm aperture during calibration, a resulting white image is obtained from an actually irradiated area of the entire field. If gain correction is performed on the actually obtained image using that white image, an incomplete gain correction is performed on an area which was not irradiated during calibration.

Besides the irradiation field limitation due to the radiation diaphragm aperture, the white image can become faulty due to the inclusion of a foreign object.

If the white image used in the gain correction is faulty, the fault migrates to subsequent images to be gain-corrected, resulting in poor gain-corrected images.

SUMMARY OF THE INVENTION

It is an object of the present invention to provide an image processing apparatus which presents a white image appropriate for use in the correction of an image of an object.

The present invention in one aspect relates to an image processing apparatus and includes a correction unit for performing a correction process on an image of an object, obtained through image capturing, with a second correction image obtained through image capturing, and a determination unit for determining the fitness of the second correction image for the correction process, wherein the determining unit determines the fitness of the second correction image for the correction process based on a result of a comparison of a first correction image obtained through image capturing and the second correction image.

The present invention in another aspect relates to an image processing method and includes a step of performing a correction process on an image of an object, obtained through image capturing, with a second correction image obtained through image capturing, and a step of determining the fitness of the second correction image for the correction process, wherein the determining step determines the fitness of the second correction image for the correction process based on a result of a comparison of a first correction image obtained through image capturing and the second correction image.

The present invention in yet another aspect relates to a processing software program for performing the function of an image processing apparatus performing a correction process on an image of an object, obtained through image capturing, with a second correction image obtained through image capturing. The program includes program code for a step of determining the fitness of the second correction image for the correction process, wherein the determining step determines the fitness of the second correction image for the correction process based on a result of a comparison of a first correction image obtained through image capturing and the second correction image.

The above arrangements present a white image appropriate for use in the correction process of the image of the object.

Further objects, features and advantages of the present invention will be apparent from the following description of the preferred embodiments with reference to the attached drawings.

DESCRIPTION OF THE PREFERRED EMBODIMENTS

Figure 1:
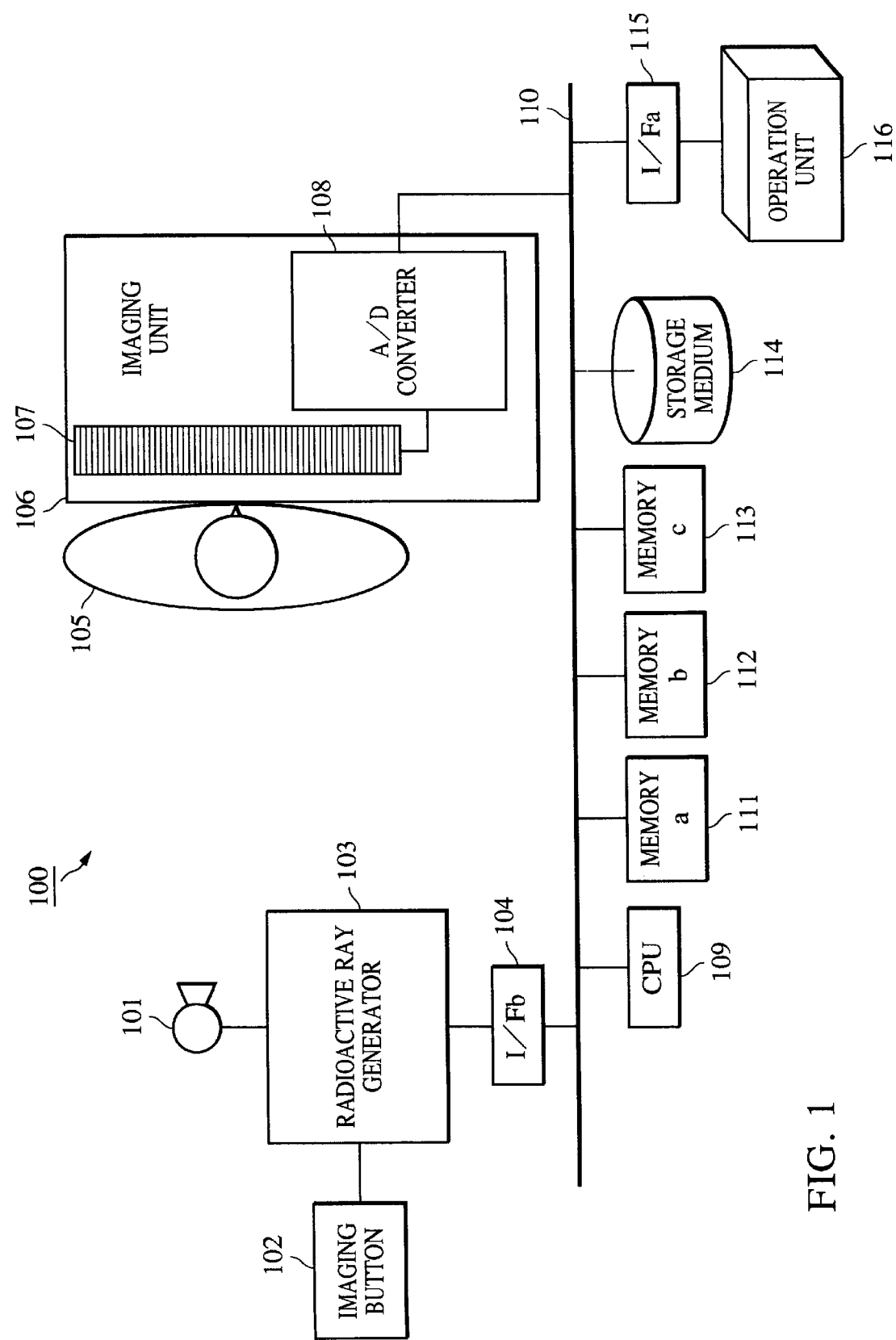
FIG. 1 is a block diagram showing the construction of a radiation image apparatus of a first embodiment of the present invention.

The embodiments of the present invention are now discussed referring to the drawings.

First Embodiment

A first embodiment of the present invention is now discussed in connection with a radiation imaging apparatus 100 shown in FIG. 1.

The radiation imaging apparatus 100 examines a white image obtained during calibration, determining whether the white image is fit for gain correction. A fault taking place in the white image is thus prevented from migrating to images to be gain-corrected.

General Construction of the Radiation Imaging Apparatus 100

Referring to FIG. 1, the radiation imaging apparatus 100 includes a radiation generator 103 for emitting a radiation (such as X rays) from a radiation emitting tube 101, an imaging button 102 for triggering the radiation generator 103 for the generation of radiation, an imaging unit 106 for capturing a radiation image of an object 105 in response to radiation generated by the radiation emitting tube 101, an operation unit 116 for inputting a variety of settings for radiation imaging, three memories 111–113, a storage medium 114, and a CPU (Central Processing Unit) 109 for generally controlling the operation of the radiation imaging apparatus 100. These units are interconnected to each other to exchange data through a bus 110.

The imaging unit 106 includes a radiation detector (a digital radiation detector) 107 and an analog-to-digital converter 108.

The digital radiation detector 107 is placed at a location exposed to the radiation from the radiation emitting tube 101, and includes an image pickup device having a photodetector, fabricated of amorphous silicon and TFTs (Thin-Film Transistors) and a phosphor deposited on the front thereof, and a driver and controller thereof, although these components are not shown.

The analog-to-digital converter 108 converts the output signal (the imaging signal) of the digital radiation detector 107 and provides a digital output signal to the bus 110.

The memory 111 (memory a) stores a variety of processing software programs for the CPU 109 to generally control the operation of the radiation imaging apparatus 100. The memory 111 is used when the CPU 109 performs a calculation process on the image.

The memory 112 (memory b) stores a digital image signal (digital image data) output by the analog-to-digital converter 108.

The memory 113 (memory c) stores a white image obtained during calibration.

The storage medium 114 stores gain-corrected image data, as opposed to the image data stored in the memory 112.

The operation unit 116, connected to the bus 110 via an interface (I/Fa) 115, includes control buttons for inputting a variety of settings, and has an image displaying function.

Through the operation unit 116, a user displays image data stored in the storage medium 114 using the image displaying function and performs a variety of operations.

The radiation generator 103, connected to the bus 110 via an interface (I/Fb) 104, generates the radiation (X rays) from the radiation emitting tube 101 in response to the pressing of the imaging button 102 or an instruction from the CPU 109.

Operational Sequence of the Radiation Imaging Apparatus 100

The operational sequence of the radiation imaging apparatus 100 is now discussed.

A user (a radiological technologist) aligns an object (a subject) 105 with the imaging unit 106, and presses the imaging button 102 to command the CPU 109 to start imaging.

In response to an imaging operation start command at the pressing of the imaging button 102 by the user, the CPU 109 controls initialization of the digital radiation detector 107, and then controls the radiation generator 103 to cause the radiation emitting tube 101 to emit radiation.

The digital radiation detector 107 is exposed to the radiation emitted from the radiation emitting tube 101, which is then transmitted through the subject 105. The digital radiation detector 107 is thus exposed to the distribution of the transmitted radiation that reflects the internal structure of the subject 105.

The digital radiation detector 107 two-dimensionally performs photoelectric conversion in response to two-dimensional light intensity distribution of the received radiation, thereby capturing an analog radiation image signal of the subject 105. The analog radiation image signal is then fed to the analog-to-digital converter 108.

The analog-to-digital converter 108 converts the analog image signal from the radiation detector 107, resulting in digital image data (radiation image data). The radiation image data is stored in the memory 112.

The memory 113 then stores a gain-correcting white image, which is obtained in a white image formation process to be discussed in detail later.

The CPU 109 reads the white image stored in the memory 113, and performs the gain correction process on the radiation image data stored in the memory 112 (a gain correction calculation process).

The CPU 109 stores the radiation image data subsequent to the gain correction process into the storage medium 114.

This completes the imaging operation.

Manipulating the operation unit 116, the user may read the radiation image data (the gain-corrected image data) from the storage medium 114 to develop the digital image on film or to feed the digital image to a diagnostic imaging monitor, depending on the purpose of application.

White Image Formation Process of the Radiation Imaging Apparatus 100

To perform a correct gain correction process in the above operational sequence, a proper white image must be first acquired through calibration.

Figure 2:
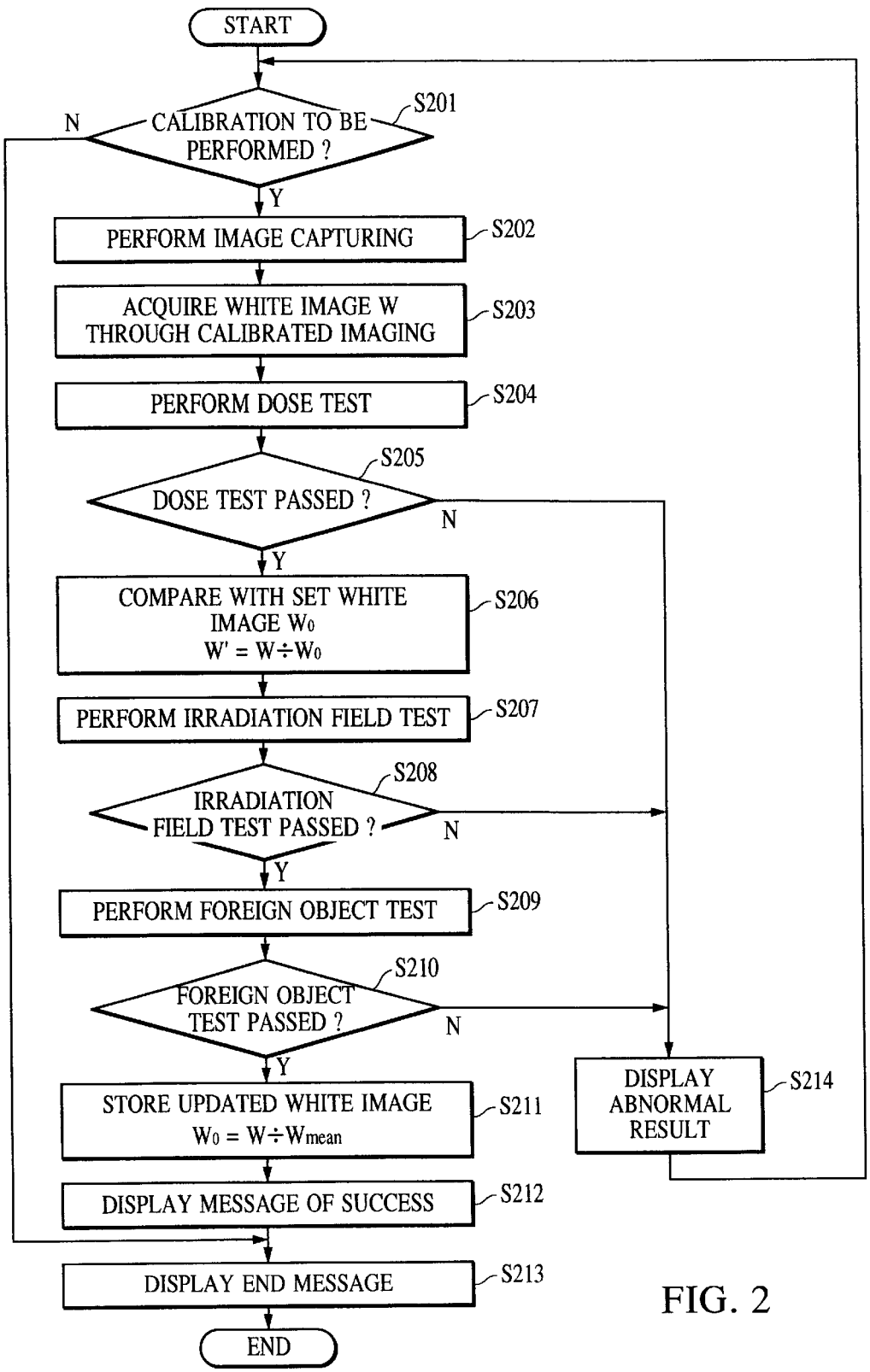
FIG. 2 is a flow diagram illustrating a white image formation process in the radiation imaging apparatus.

In the first embodiment, the CPU 109 executes a processing program in accordance with a flow diagram shown in FIG. 2 to acquire a proper white image for the gain correction process.

The white image formation process is performed when the user sets the operation mode of the radiation imaging apparatus 100 to a calibration mode by operating the operation unit 116.

Step S201

When the radiation imaging apparatus 100 enters into a calibration mode, the CPU 109 queries the user whether to start calibration. For example, the CPU 109 queries the user whether to start calibration on the display function of the operation unit 116, and prompts the user to enter a reply ("Calibrate" or "No calibrate").

When the reply from the user is "No calibrate", the CPU 109 performs step S213 to be discussed later. When the reply from the user is "Calibrate", the CPU 109 performs the calibration process, starting with step S202.

Step S202

When the user selects "Calibrate" in step S201, the CPU 109 controls the digital radiation detector 107 to put the radiation imaging apparatus 100 in a calibration enable state in which imaging is possible with no subject 105 included.

After ensuring that the digital radiation detector 107 is ready for calibration imaging (with the preparation for imaging completed), the CPU 109 displays a label to that effect using the display function of the operation unit 116, and waits for a calibration imaging start command provided by the user.

When the user inputs the calibration imaging start command, the CPU 109 performs control as discussed in the section for the <Operational sequence of the radiation imaging apparatus 100>. However, the imaging operation is performed with no subject 105 included in the irradiation field of the apparatus 100. The radiation image thus obtained is a candidate as a white image to be used in the gain correction process.

The process to be discussed is to determine whether an obtained white image is fit for use in the gain correction process, in other words, whether a calibration imaging has been properly performed.

To determine the fitness of the white image, the dose (amount of radiation) and irradiation field of radiation, and the presence or absence of a foreign object are checked. When all fitness criteria are satisfied, the calibration is considered as being normally completed.

Step S203

The CPU 109 treats the white image as a candidate obtained in step S202 as "W".

Step S204

The CPU 109 inspects the dose of radiation.

The inspection of the radiation dose is performed, because the effective area of the digital radiation detector 107 (the photosensitive surface of the imaging unit) must be entirely irradiated with radiation at an appropriate dose level with no object 105 being present. Further, the radiation dose needs to be inspected from the standpoint of performing proper gain correction and preventing noise from migrating to the images.

Specifically, noise attached to the white image migrates to the radiation images taken thereafter each time the gain correction process is performed. For this reason, the white image must be captured under low noise level conditions.

However, if the dose level is too low, noise from the digital radiation detector 107 and the analog-to-digital converter 108 becomes relatively high in level, affecting the white image. If the dose level is too high, the digital radiation detector 107 and the analog-to-digital converter 108 in the input/output characteristics thereof suffer from poor linearity. The white image becomes invalid for the gain correction process.

To determine whether the radiation dose is at an appropriate level, the CPU 109 extracts pixels in a central area (for example an area having a matrix of 100 pixels by 100 pixels) of the digital radiation detector 107 (the photosensitive surface of the imaging unit) less sensitive to the shading effect of the radiation in the white image W in step S203, and calculates the mean of pixel values.

Step S205

The CPU 109 determines the mean pixel value acquired in step S204 falls within a predetermined reference range.

When it is determined that the mean pixel value falls out of the predetermined reference range (a proper dose-level irradiation is not performed), the CPU 109 performs step S214 to be discussed later. When it is determined that the mean pixel value falls within the predetermined range (a proper dose-level irradiation is performed), the CPU 109 continues at step S206.

Step S206

The CPU 109 performs an irradiation field test.

This test is needed because the white image, if obtained with the effective area of the digital radiation detector 107 (the photosensitive surface of the imaging unit) partly unirradiated during the calibration, cannot correctly perform a gain correction process in the pixels outside the irradiated area.

In step S206, the CPU 109 reads the white image Wo obtained in a previous calibration from the memory 113, divides a white image candidate W by the white image Wo, and stores a resulting image W' (=W/Wo) in the memory 112.

The purpose of the division is to roughly correct gain variations in the digital radiation detector 107 (gain variations across pixels of the image pickup device), and to increase examination accuracy. An image fault examination is performed after removing gain variations in the digital radiation detector 107. Step S206 is performed for the following two reasons. 1) Gain variations in the digital radiation detector 107 typically range from several percent to tens of percent; on the other hand, variations to be examined in the examination to be discussed is on the order of several percent. 2) Although the gain variations in the digital radiation detector 107 slightly vary depending on imaging conditions and ambient temperature, the magnitude thereof is generally constant. For the reasons 1) and 2), the gain variations in the digital radiation detector 107 are roughly corrected by dividing the current white image by the previous white image, and the image fault examination is performed to increase the imaging accuracy. In the first embodiment, the white image candidate W is divided by the white image Wo. Alternatively, a difference between the white image Wo and the white image candidate W may be employed.

The reason the white image W is divided by the white image Wo obtained in the previous calibration imaging is as follows. The user must regularly calibrate the imaging system to maintain it in a satisfactory operating condition. The calibration is intended to correct chronological change in sensor gain variations and to avoid correction fault due to a change in operational conditions. In the first embodiment, a previous white image is used to determine a new calibration for a fitness test. If the apparatus is used daily, yesterday's white image is used to test today's calibration, and today's white image will be used to test tomorrow's calibration. In a preferred embodiment, the latest (previous) white image Wo from among regularly obtained white images Wo is used. The present invention is not limited to this. The white image Wo may be updated regularly or at any time as the user prefers, or on a non-regular basis.

Step S207

The CPU 109 subtracts pixels on both sides of, and immediately above and below, a pixel W' of interest stored in the memory 112 from the pixel W' of interest to form a two-dimensional differential image. The CPU 109 binarizes the differential image, thereby determining an edge of change in the radiation dose.

Step S208

The CPU 109 determines from the detection result from step S207 whether the irradiation field is appropriate.

When the CPU 109 determines that the irradiation field is not appropriate (i.e., the effective imaging area is not entirely irradiated), the CPU 109 performs step S214 to be discussed later. When the CPU 109 determines that the irradiation field is appropriate (i.e., the effective imaging field is entirely irradiated), the CPU 109 continues at step S209.

The determination in step S207, serving as a criterion in the determination of the irradiation field, is discussed by way of example, and the present invention is not limited this method.

Step S209

The CPU 109 inspects the presence or absence of a foreign object.

The calibration imaging can be performed with a foreign object included. If the subject 105 is imaged with the foreign object removed, and if the radiation image is then subjected to the gain correction process using the white image with the foreign object included, gain can be excessively raised at the location of the foreign object. The foreign object test is thus performed to avoid the inclusion of the foreign object in the radiation image after the gain correction process. The foreign object may be dust, remnants of imaging agents or handwriting with a pencil core.

In step S209, the CPU 109 divides the image W' stored in the memory 112 into tiny segments of 100 pixels by 100 pixels, and then determines the mean pixel values Eij and the standard deviation Sij at each segment. Here, "ij" represent the coordinates of each segment.

Step S210

The CPU 109 determines from the mean pixel values Eij and the standard deviations Sij obtained in step S209 whether a foreign object is included.

Specifically, a mean value E of surrounding segments of a segment ij having a mean value of Eij (here eight segments) is determined by equation (1).

$$E = \left\{ \sum_{x=i-1}^{i+1} \sum_{y=j-1}^{j+1} E_{xy} - E_{ij} \right\} \Big/ 8 \quad (1)$$

The mean value E is compared with Eij. A mean value S of standard deviations of surrounding segments of the segment ij having a standard deviation Sij (here eight segments) is determined by equation (2).

$$S = \left\{ \sum_{x=i-1}^{i+1} \sum_{y=j-1}^{j+1} S_{xy} - S_{ij} \right\} \Big/ 8 \quad (2)$$

The mean value S of the standard deviations is compared with the standard deviation Sij. These comparison results indicate whether the mean value Eij and the standard deviation Sij vary, and therefore determines whether a foreign object is included. For example, the mean value Eij indicating a variation of 1% or more with respect to the mean value E determines that a foreign object is present. The standard deviation Sij indicating a variation three times as large as, or larger than, that in the mean value S of the standard deviations determines that a foreign object is present.

The determination criteria (a variation of 1% or more and three times as large as or larger than) are dependent on the S/N ratio of the radiation imaging apparatus 100.

When it is determined that a foreign object is present, the CPU 109 performs step S214. When it is determined that no foreign object is present, the CPU 109 continues at step S211.

Step S211

When determination results in steps S205, S208, and S210 are all normal (passed the tests), the CPU 109 updates the white image stored in the memory 113 with the white image (W) obtained in this calibration.

Specifically, the CPU 109 divides the white image W by the mean pixel value (Wmean) of the white image W for normalization, thereby acquiring a white image Wo (=W/Wmean). The white image Wo is then stored in the memory 113.

Step S212

The CPU 109 displays through the display function of the operation unit 116 a message indicating that the calibration has been successfully completed.

Step S213

Subsequent to step S212 or when the user selects "No calibrate" in the above-mentioned step S201, the CPU 109 displays through the display function of the operation unit 116 a message indicating that calibration has ended.

The radiation imaging apparatus 100 now exits the calibration mode, and is ready for normal imaging (for the subject 105).

Step S214

When any one of determination results in steps S205, S208 and S210 is abnormal, the imaging may have been performed at an improper dose level, the effective imaging area may not have been entirely irradiated or a foreign object may have been included. The CPU 109 displays the abnormal test result through the display function of the operation unit 116.

The CPU 109 then starts over at step S201, and the user is again asked whether or not to perform the calibration.

Through the white image formation process of the first embodiment, a proper white image is always acquired for the gain correction process. Thereafter, the proper white image is then used to perform the gain correction on the radiation image obtained through radiation imaging (for the subject 105). A gain-corrected image is thus reliably obtained.

In the first embodiment, initial values for a white image to be stored in the memory 113 are acquired in a dedicated mode for acquiring the white image initial values at the installation of the radiation imaging apparatus 100.

Specifically, when the radiation imaging apparatus 100 is installed, the operation mode of the radiation imaging apparatus 100 is set to the dedicated mode (a service mode) and is then operated. This imaging operation is different from the sequence shown in FIG. 2. The radiation imaging apparatus 100 merely performs a calibration imaging, and stores a resulting radiation image in the memory 113 as a white image. In this way, no error is introduced because the comparison (the process step S206 shown in FIG. 2) cannot be performed between the white image resulting from the previous calibration imaging and the white image resulting from this calibration imaging.

The tests are conducted to examine the dose level, the irradiation field, and the presence or absence of a foreign object in the first embodiment. The test items are not limited to these three. For example, when the radiation imaging apparatus 100 uses a movable grid, a check may be made to make sure that the grid correctly moves, and that the mesh of the grid is correctly imaged. Further, a check may be made to make sure that any image acquisition hardware does not create data contamination.

In the first embodiment, the CPU 109 carries out the process shown in FIG. 2 by executing the processing program (in software). Alternatively, the process may be carried out in hardware. The use of the hardware shortens process time.

Second Embodiment

Figure 3:
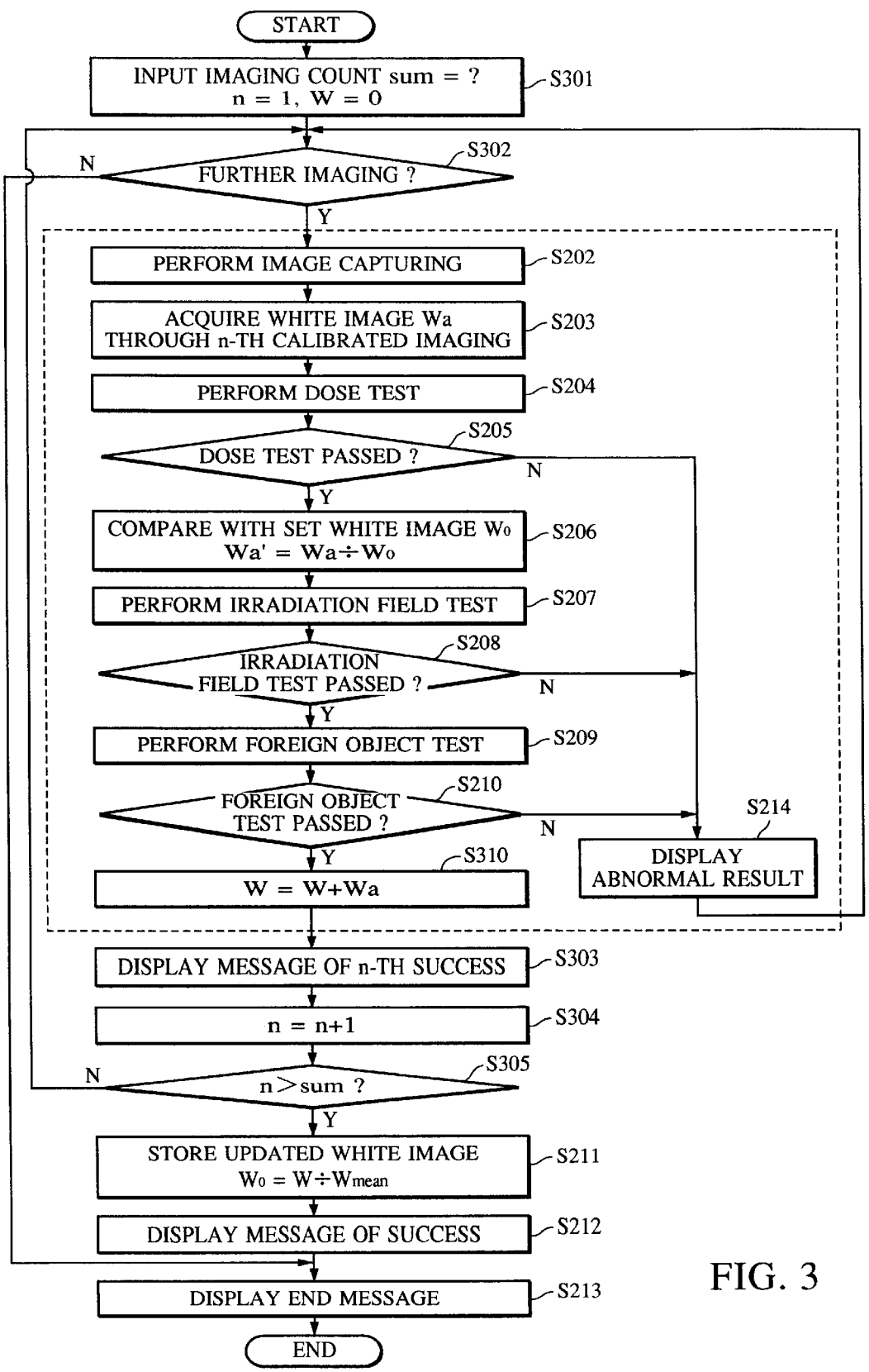
FIG. 3 is a flow diagram illustrating a white image formation process in a second embodiment of the present invention.

In a second embodiment, the radiation imaging apparatus 100 shown in FIG. 1 performs a white image formation process in accordance with a flow diagram shown in FIG. 3.

The difference between the first embodiment (see FIG. 2) and the second embodiment in the white image formation process lies in that the second embodiment allows the user to perform calibration imaging a plurality of times.

Performing a plurality of calibrations is intended to remove random noise superimposed on the white image.

The "random noise" refers to radiation quantum noise and apparatus generating noise.

The greater the number of calibration (the calibration count), the effect of noise is significantly canceled. This is attributed to the fact that the incident X rays are extremely small in number compared with the visible light rays. Several fluctuating X ray quanta reach the sensor, thereby causing random noise to be directly superimposed on an input image. If a single calibration is made, and if a uniform image resulting from the same dose level is gain-corrected by the white image, the noise level of X ray quantum noise is raised by the square root of 2. To reduce the noise level, the calibration imaging count is increased to smooth the noise.

A larger number of calibrations cancels the effect of noise more, while involving the larger number of operational steps for imaging, namely increasing work load to the user.

In the second embodiment, the calibration imaging count is selected by the user.

In the flow diagram shown in FIG. 3, steps identical to those with reference to FIG. 2 are designated with the same step number, and the detailed discussion thereof is skipped.

Step S301

When the radiation imaging apparatus 100 is put into the calibration mode, the CPU 109 requests the user to input the calibration imaging count. For example, through the display function of the operation unit 116, the CPU 109 displays a screen for receiving an input about the calibration count, and requests the user to input a desired calibration imaging count on the screen.

The user then inputs a desired calibration count on the screen provided by the display function of the operation unit 116.

The CPU 109 sets the number of calibrations input by the user in "sum" while initializing a counter n, indicating successful imaging cycles, to "1", and the white image W prior to normalization to "0".

The CPU 109 stores the imaging count, sum, the count n, and the white image W in the memory 112.

Step S302

The CPU 109 queries the user whether to continue the calibration imaging. For example, through the display function of the operation unit 116, the CPU 109 queries the user whether to continue the calibration imaging, thereby prompting a reply to the query ("Continue calibration" or "Exit calibration").

When the user reply is "Exit calibration", the CPU 109 performs step S213. When the user reply is "Continue calibration", the CPU 109 continues at step 202.

Step S202–step S210

When the user reply is "Continue calibration", the CPU 109 performs control to put the radiation imaging apparatus 100 into a calibration imaging ready state. In response to an imaging start command from the user, the CPU 109 initiates the imaging operation (step S202). The radiation image is now regarded as a white image candidate (Wn) at an n-th calibration (step S203).

The CPU 109 examines the dose level and the irradiation field of the radiation, and the presence or absence of a foreign object (steps S204–S210).

Step S310

When determination results in steps S205, S208, and S210 are all normal (passed the tests), the CPU 109 adds the white image Wn at the n-th calibration to the white image W prior to normalization in the memory 112 (W=W+Wn).

Step S303

The CPU 109 displays, through the display function of the operation unit 116, a message indicating that the n-th calibration imaging has successfully been completed.

Step S304, and Step S305

The CPU 109 adds "1" to the count n of the counter n (step S304), and determines whether the updated count of the counter n exceeds the calibration count sum.

When the determination result is not n>sum, the CPU 109 returns to step S302 to start over. When the determination result is n>sum, the CPU 109 continues at step S211.

Step S211

When the determination result in step 305 is n>sum, in other words, when the calibration count desired by the user is completed, the CPU 109 divides the white image W stored in the memory 112 by a mean pixel value (Wmean) of the white image W for normalization, acquiring the image Wo (=W/Wmean). The image Wo is stored in the memory 113 as a white image to be used for the gain correction process.

Step S212

The CPU 109 displays, through the display function of the operation unit 116, a message indicating that the sum of calibrations has been successfully completed.

Step S213

Subsequent to step S212 or when the user selects "Exit calibrate" in the above-mentioned step S301, the CPU 109 displays through the display function of the operation unit 116 a message indicating that the calibration has ended.

The radiation imaging apparatus 100 now exits the calibration mode, and is ready for normal imaging (for the subject 105).

The white image W stored in the memory 112 is not updated when the radiation imaging apparatus 100 exits as a result of an aborted calibration.

Step S214

When any one of determination results in steps S205, S208, and S210 is abnormal, the CPU 109 displays the abnormal test result through the display function of the operation unit 116.

The CPU 109 starts over at step S201. The user is again asked whether to perform the calibration. The count n of the counter is not updated, and an n-th calibration is again performed.

In the white image formation process in the second embodiment, each of white images resulting from a plurality of calibrations is examined in terms of fitness as a white image to be used for the gain correction process regardless of whether an imaging fault suddenly takes place. For example, if ten white images are obtained from ten calibrations with one of the ten image at fault, the image fault is averaged to one-tenth, but the image fault may migrate to nine normal images. In accordance with the second embodiment, however, the fitness determination is carried out for all white images one by one. The appropriate white image is always used for the gain correction process for the radiation imaging thereafter (for the subject 105). The properly gain-corrected image is thus reliably obtained. Since the calibration count is selected by the user himself, the user can adjust the calibration count in a balanced manner in consideration of other jobs.

There are times when the effective imaging area of the imaging unit 106 is not entirely irradiated even with the aperture opened, because of a near range imaging. In this case, the calibration imaging needs to be performed under the same conditions. When the irradiation field for the white image candidate fails to cover the effective imaging area, the radiation imaging apparatus 100 may leave the determination of the white image candidate to be valid/not valid to the user's selection while the irradiation field test result is presented to the user, rather than immediately determining the white image candidate to not be valid with an abnormal message presented to the user as already discussed in connection with the first and second embodiments.

When the irradiation field fails to cover the effective imaging area during the calibration imaging, and when the irradiation field during the calibration imaging and the irradiation field during clinical imaging are not aligned, an artifact is introduced in the image after the gain correction process. But such a problem is resolved by the gain correction method disclosed in Japanese Laid-Open Patent No. 2-4545 which is assigned to the same assignee of this invention.

Specifically, in this gain correction process, a white image is acquired beforehand from a calibration imaging with the entire effective imaging area fully irradiated. The obtained beforehand white image is combined with a white image resulting from calibration imaging operations performed with a predetermined period with the effective imaging area not entirely irradiated. Thus, a white image having the entire effective area irradiated results.

In another method, only the overlapping portion of a white image resulting from calibration imaging and an image resulting from the imaging of an object may be output as an image.

The artifacts are eliminated or reduced through the gain correction methods above.

Third Embodiment

Figure 4:
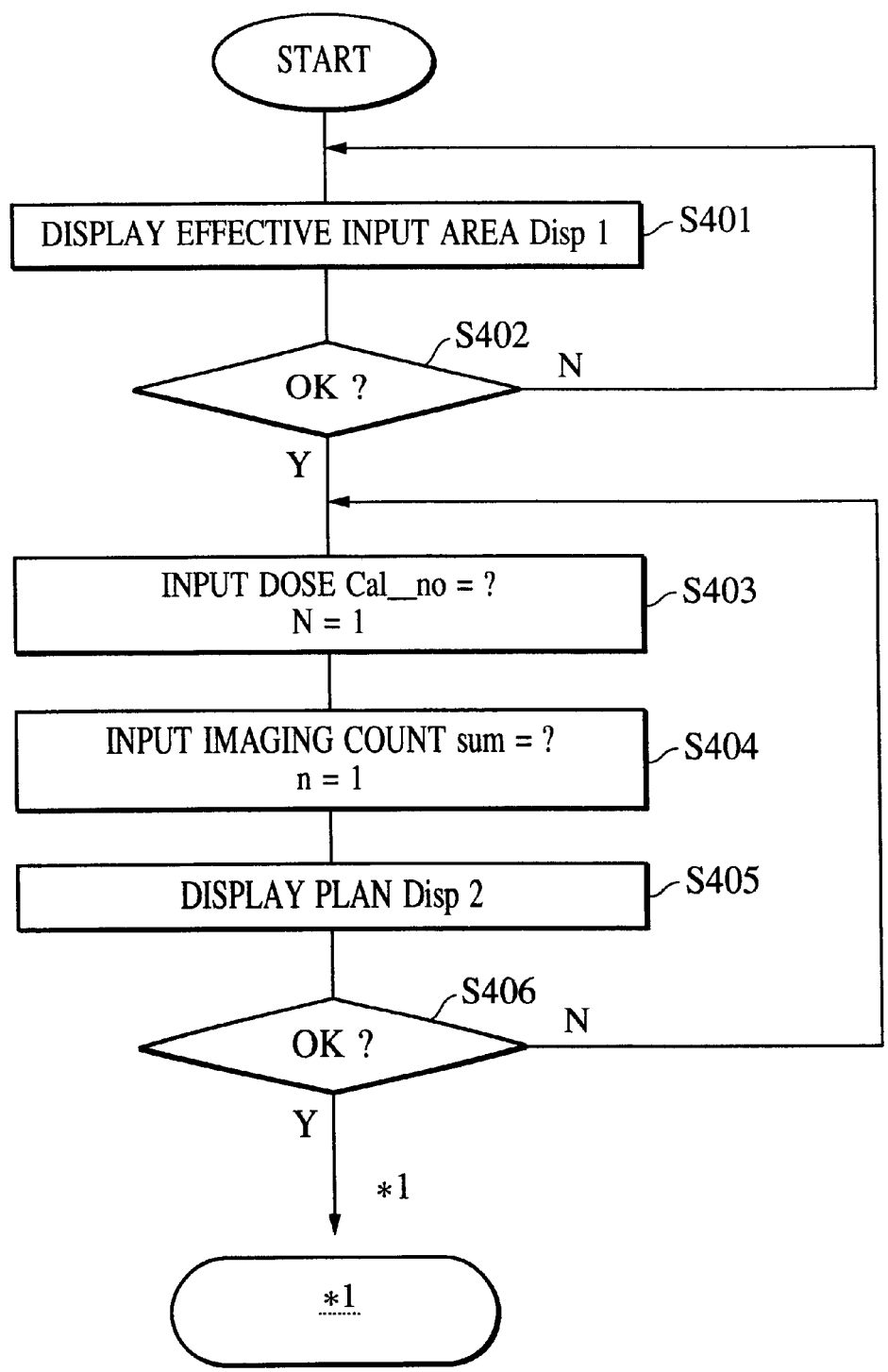
FIG. 4 is a flow diagram illustrating a white image formation process in a third embodiment of the present invention.
Figure 5:
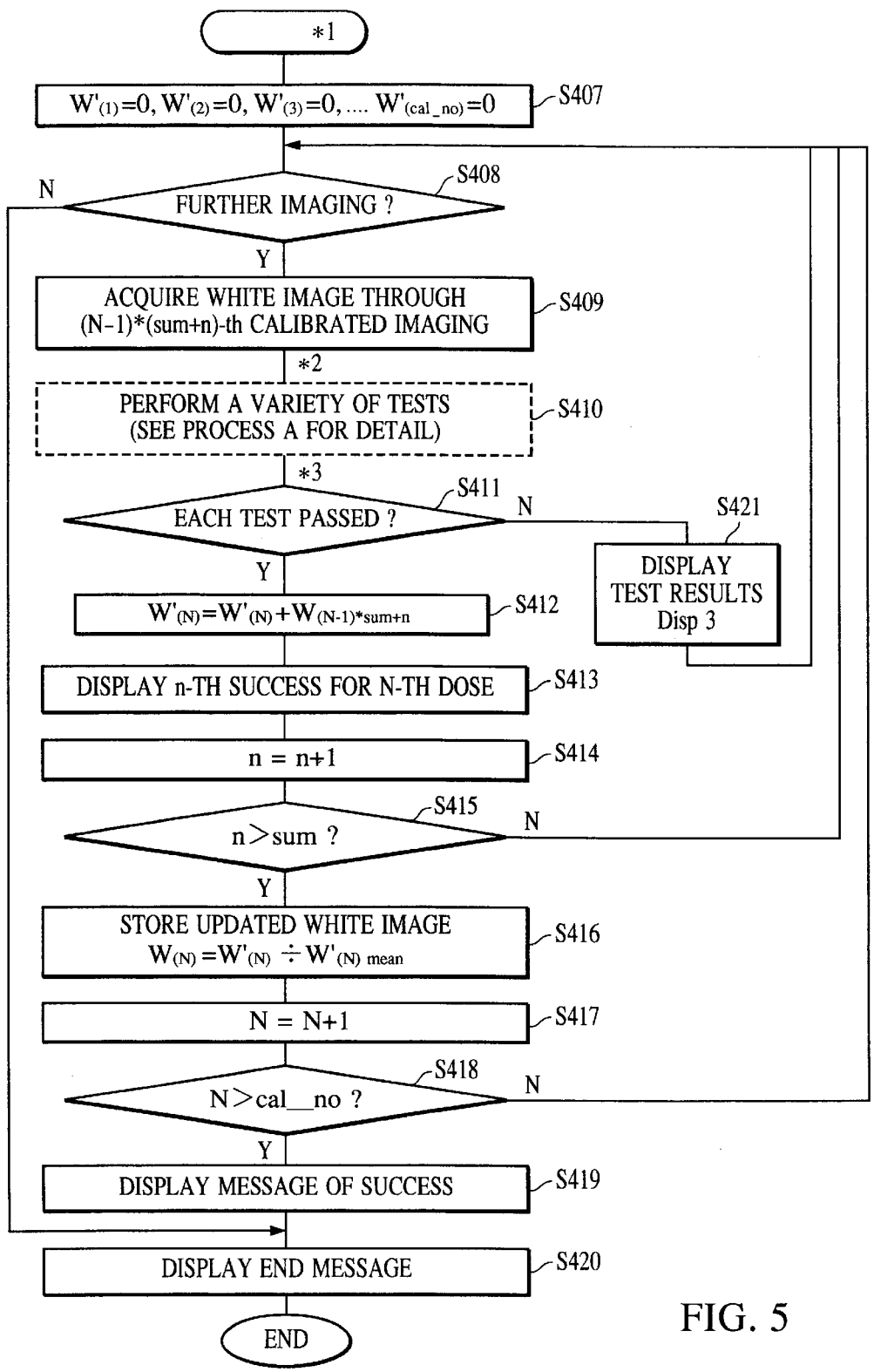
FIG. 5 is a flow diagram illustrating a white image formation process in the third embodiment of the present invention.
Figure 6:
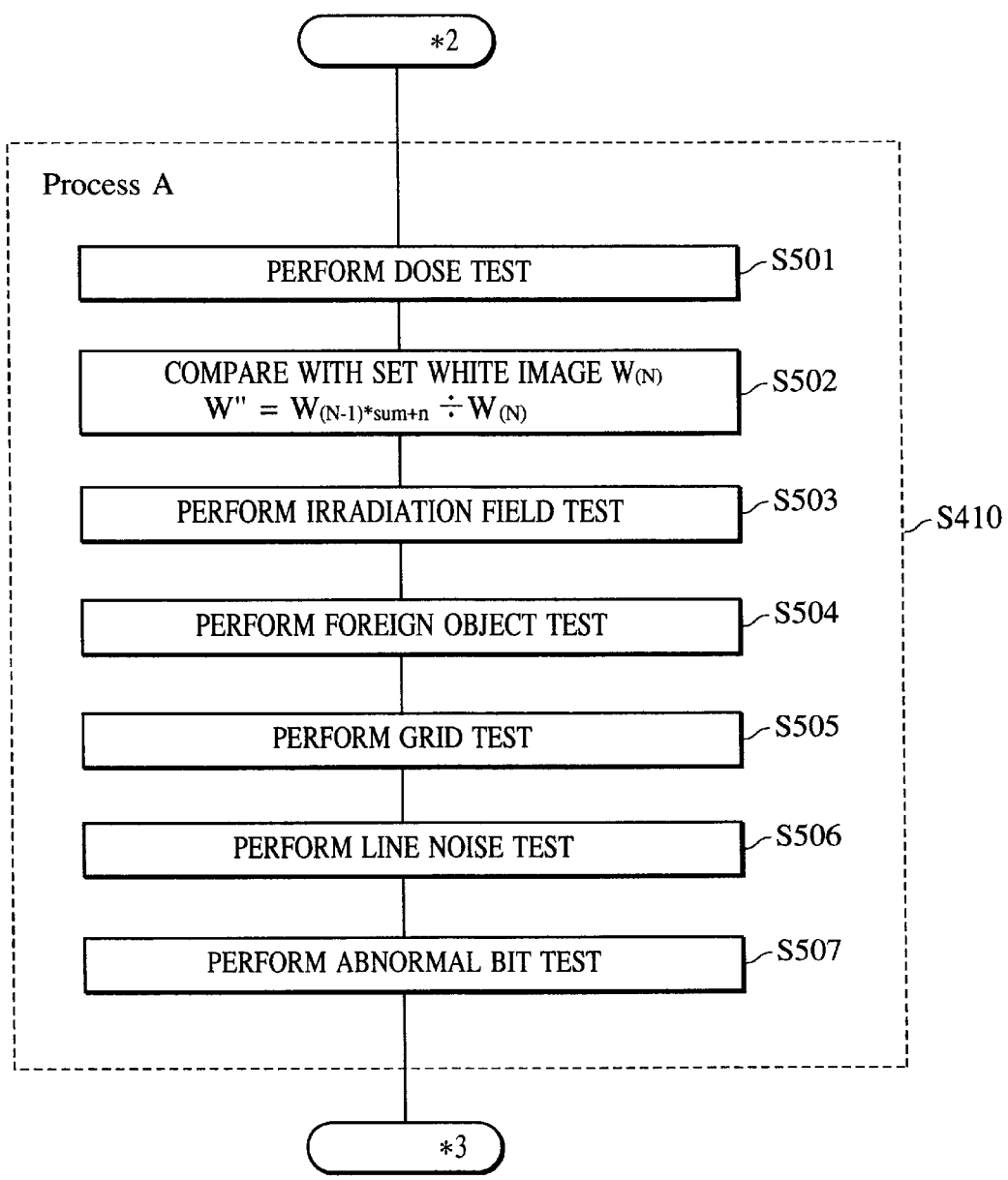
FIG. 6 is a flow diagram illustrating a white image formation process in the third embodiment of the present invention.

In a third embodiment, the radiation imaging apparatus 100 performs a white image formation process in accordance with flow diagrams shown in FIGS. 4, 5, and 6. FIG. 5 is a continuation of the flow diagram of FIG. 4, and both figures are linked by a mark *1. FIG. 6 is a flow diagram that illustrates step S410 in more detail in FIG. 5, and both figures are linked by marks *2 and *3.

The difference between the white image formation process in the first embodiment (see FIG. 2) and the white image formation process in the third embodiment lies in that the third embodiment allows the user to perform any plural number of calibrations. The difference between the white image formation process in the second embodiment (see FIG. 3) and the white image formation process in the third embodiment lies in that the third embodiment allows the user to perform any plural number of calibrations with a different dose level. Further, the user is allowed to designate a determination area for a calibration quality test.

Performing a plurality of calibrations is intended to remove random noise superimposed on the white image at each calibration.

The "random noise" refers to radiation quantum noise and apparatus generating noise.

A larger calibration count cancels the effect of noise more, while involving the larger number of operational steps for imaging. In the third embodiment, the calibration count is selected by the user.

The white images obtained from radiation of different dose levels are intended to correct nonlinearity of the radiation detector. Even if linearity is maintained in a middle region of a dose level, linearity of output characteristics is destroyed by an error in an offset correction in a low-dose level region. The linearity of the output characteristics is also destroyed by saturated characteristics of the radiation detector in a high-dose level region. The non-linearity is compensated for by selectively using white images having different dose-level regions in response to the output value.

The calibration quality determination area is set up by the user, just in case the effective imaging area is not entirely irradiated for some reason. For example, this is the case when the imaging unit 106 and the radiation emitting tube 101 are not sufficiently spaced apart. Another case is that an obstacle covers the imaging unit 106 for shielding for installation layout reasons or clinical concerns.

In any case, if radiation of a sufficient dose level fails to reach part of the effective imaging area during the calibration imaging, and a fitness test to be discussed later may determine the resulting white image to not be valid. To avoid such a determination, the user designates beforehand an invalid area, to exclude the designated invalid area from the fitness test. The invalid result in the fitness test to be discussed later lets the user know the cause of the insufficient irradiation of the invalid area.

Figure 7A:
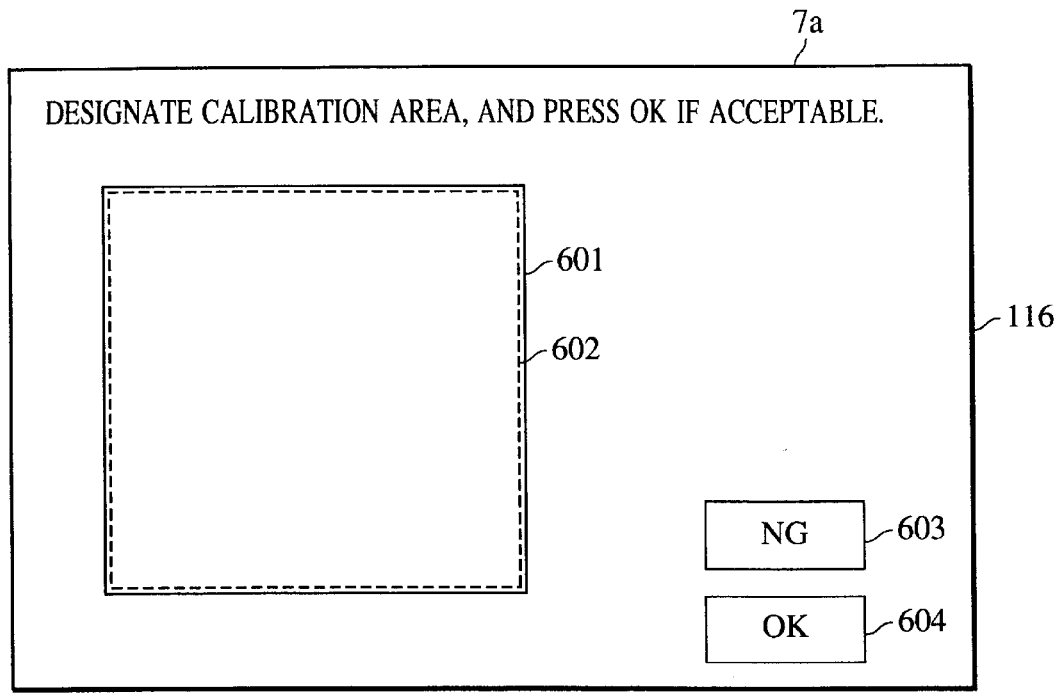
FIGS. 7A and 7B show a display screen illustrating an input request to a user in the third embodiment of the present invention.
Figure 7B:
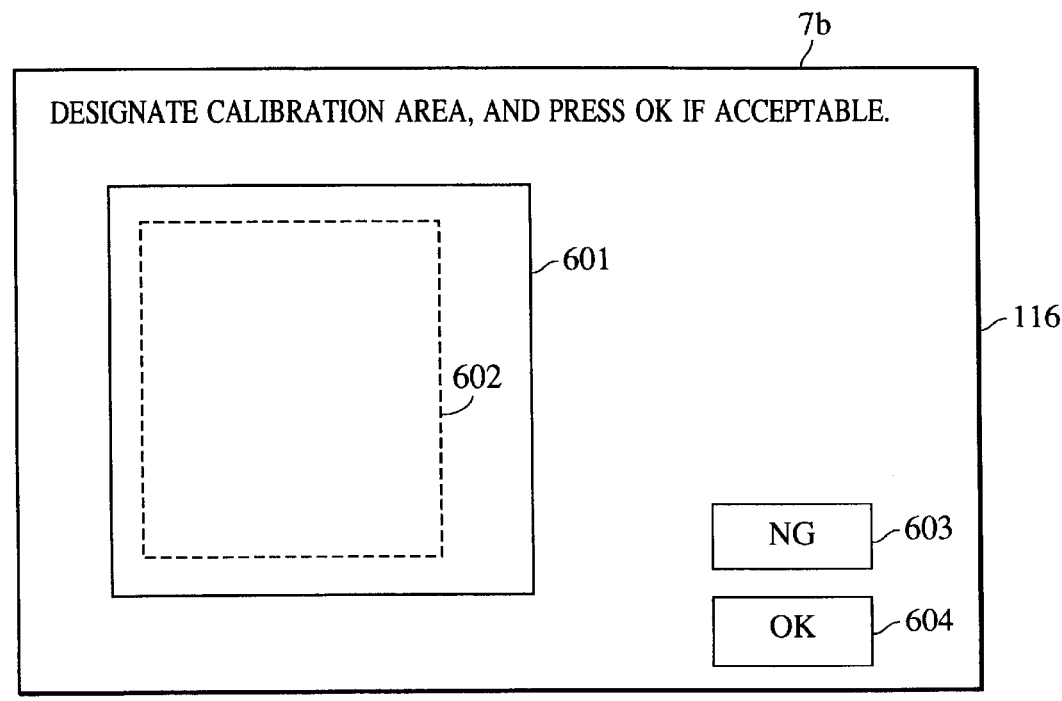
Figure 8:
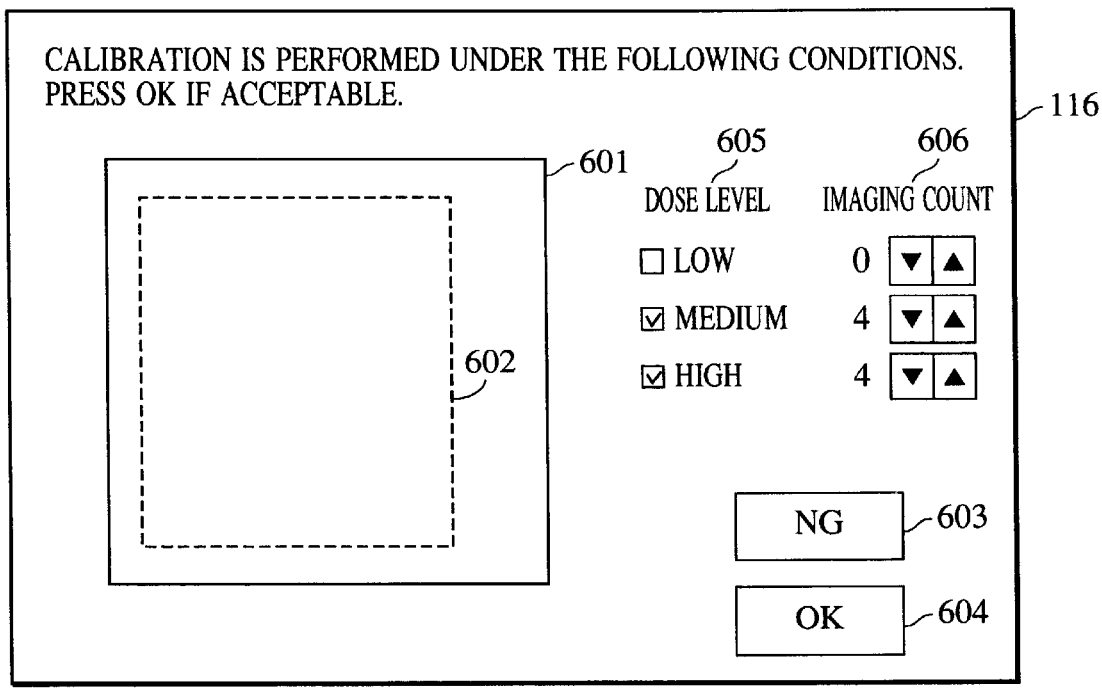
FIG. 8 shows a display screen illustrating an input request to a user in the third embodiment of the present invention.

Steps S401 through S419 in FIGS. 6, 7, and 8 are now discussed.

Step S401

When the radiation imaging apparatus 100 is put into the calibration mode, the CPU 109 requests the user to input a calibration effective area.

For example, as represented by 7a in FIG. 7A, the CPU 109 displays an effective area 601 represented by a solid line and a calibration area represented by a broken line through the display function of the operation unit 116. The user is thus requested to enter the calibration imaging count on the screen. In the third embodiment, the input section of the operation unit 116 is a display having a touch sensor. Alternatively, a mouse may be used.

The calibration area 602 may be a previously used one at the moment the calibration mode is entered, i.e., with no area input, or may be the entire area. When the user touches any two points within the effective area, a rectangular calibration area 602 having a diagonal that ends at the two designated points is displayed. The user can thus designate a desired calibration area on the screen presented by the display function of the operation unit 116.

Step S402

The CPU 109 queries the user whether the calibration area 602 formed in response to the user request is acceptable. For example, as represented by 7b in FIG. 7B, the CPU 109 displays the calibration area 602 designated in step S401. If the user is not satisfied for any reasons including erroneous input, the user may press a NG (no good) button 603. The algorithm then returns to step S401.

When the user is satisfied with the shown calibration area 602, the user presses an OK button 604, and the CPU 109 continues at step S403.

Steps S403–S406

The CPU 109 requests the user to enter the dose level of radiation. The CPU 109 sets the dose level input by the user into "cal_no" while initializing the count N of the counter N, for counting successful imaging cycles, to "1". The CPU 109 stores the calibration dose level cal_no and the count N in the memory 112 (step S403).

In succession, the CPU 109 requests the user to input the calibration imaging count at each dose level. The CPU 109 sets the imaging count input by the user to "sum" while initializing the count n of the counter n, indicating successful imaging cycles, to "1". The CPU 109 stores the imaging count sum and the count n in the memory 112 (step S404).

The input request and input at steps S403 and S404 are performed using the display function and input function of the operation unit 116.

The CPU 109 displays, to the user, the calibration area selected in step S402 and the calibration dose level and the imaging count at each calibration dose level selected in steps S403 and S404, and queries the user whether the calibration plan is acceptable (step S405).

The execution of steps S403–S405 are performed using the display function and input function of the operation unit 116 shown in FIG. 8. The calibration area 602 is shown inside the effective area 601. In the third embodiment, the radiation dose is divided into three dose-level regions 605. The user is allowed to select one from among the three levels. In the third embodiment, a low dose level and a high dose level can be deselected, but a medium dose level must always be selected. In other words, the minimum 1 (the medium dose level) to the maximum 3 (the low dose level, the medium dose level, and the high dose level) are available. The number of steps in dose level may be increased. To input the dose level, the user selects a desired dose level, and presses a check button on the left of each dose level label in a toggle fashion to select or to deselect. With any check button already pressed at the moment of pressing an OK button 604, the calibration is performed under the selected dose level.

In the third embodiment, the imaging count at each dose level is input using a downward looking button for down counting and an upward looking button for upward counting while referring to the figure at an imaging count 606. Any dose not selected at the dose level display 605 presents zero with the downward looking button and the upward looking button inoperative. A dose selected at the dose level display 605 presents a number equal to or greater than 1. The imaging count setting at the moment the OK button 604 is pressed becomes the calibration imaging count at each dose level.

Figure 9:
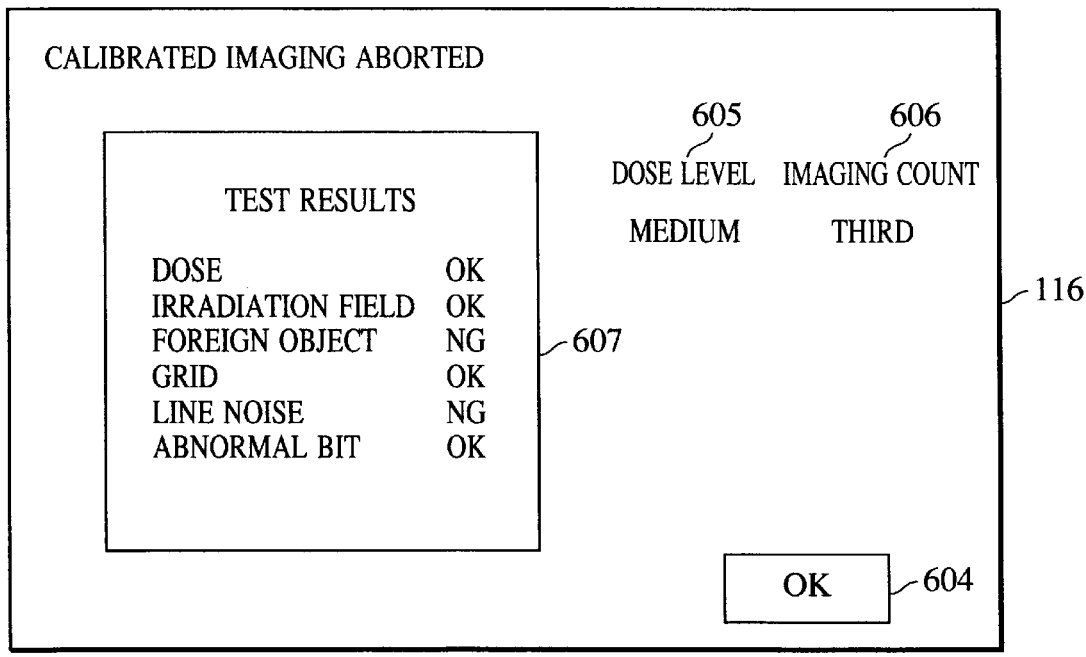
FIG. 9 shows a display screen illustrating an input request to a user in the third embodiment of the present invention.

The CPU 109 queries the user whether the displayed calibration plan is acceptable. The display function and input function of the operation unit 116 shown in FIG. 9 are used. If the user is not satisfied for any reason including erroneous input, the user may press the NG button 603. The algorithm then returns to step S403. When the user is satisfied with the calibration plan, the user presses the OK button 604, and the CPU 109 continues at step S407 (step S406).

Step S407

The CPU 109 initializes a plurality of white images $W'_{(1)}$, $W'_{(2)}$, $W'_{(3)}$, . . . , $W'_{(cal\_no)}$ prior to normalization to "0".

Step S408

The CPU 109 queries the user whether to continue the calibration. For example, the CPU 109 queries the user whether to start calibration on the display function of the operation unit 116, and prompts the user to enter a reply ("Continue calibration" or "Exit calibration").

When the reply from the user is "Exit calibration", the CPU 109 performs step S420 to be discussed later. When the reply from the user is "Continue calibration", the CPU 109 performs the calibration process, starting with step S409.

Step S409

When the user selects "Calibrate" in step S408, the CPU 109 controls the digital radiation detector 107 to place the radiation imaging apparatus 100 in a calibration enable state in which imaging is possible with no subject 105 included.

After ensuring that the digital radiation detector 107 is ready for the calibration imaging (with the preparation for imaging completed), the CPU 109 displays a label to that effect using the display function of the operation unit 116, and waits for a calibration imaging start command provided by the user.

When the user inputs the calibration imaging start command, the CPU 109 performs control as discussed in the section for the Operational sequence of the radiation imaging apparatus 100. However, the imaging operation is performed with no subject 105 in place. The radiation image thus obtained is a candidate $W_{((N-1)*sum+n)}$ as a white image to be used in the gain process.

Step S410

The CPU 109 tests the white image candidate $W_{((N-1)*sum+n)}$ in terms of its fitness as a calibration image. FIG. 6 shows test steps S501–S507. In FIG. 5, steps S501–S507 are collectively designated a fitness examination in step S410.

Test items include a dose test (step S501), an irradiation field test (step S503), a foreign object test (step S504), a grid test (step S505), a line noise test (step S506), and an abnormal bit test (step S507). These test items, except for the dose test (step S501), needs the comparison of the white image candidate $W_{((N-1)*sum+n)}$ with a previous white image $W_{(N)}$ performed in step S502. Although the dose test must be performed first for this reason, the order of the remaining test items is discretionary.

Step S501

The CPU 109 performs the dose test.

The checking of the radiation dose is performed, because the effective area of the digital radiation detector 107 (the photosensitive surface of the imaging unit) must be entirely irradiated with radiation at an appropriate dose level with the subject 105 not in place. Further, the radiation dose needs to be inspected from the standpoint of performing proper gain correction and preventing noise from migrating to the images.

Specifically, noise attached to the white image migrates to the radiation images taken thereafter each time the gain correction process is performed. The white image must be captured under low noise level conditions.

However, if the dose level is too low, noise from the digital radiation detector 107 and the analog-to-digital converter 108 becomes relatively high in level, affecting the white image. If the dose level is too high, the digital radiation detector 107 and the analog-to-digital converter 108 in the input/output characteristics thereof suffer from poor linearity. The white image then becomes invalid for the gain correction process.

To determine whether the radiation dose is at an appropriate level, the CPU 109 extracts pixels in a central area (for example an area having a matrix of 100 pixels by 100 pixels) of the digital radiation detector 107 (the photosensitive surface of the imaging unit) less sensitive to the shading effect of the radiation in the white image candidate $W_{((N-1)*sum+n)}$ obtained in step S409, and calculates the mean of pixel values.

The CPU 109 determines the mean pixel value acquired in step S409 falls within a predetermined reference range.

When it is determined that the mean pixel value falls out of the predetermined reference range (a proper dose-level irradiation is not performed), the CPU 109 determines that the dose level has failed the dose test. When it is determined that the mean pixel value falls within the predetermined range (a proper dose-level irradiation is performed), the CPU 109 determines that the dose level has passed the dose test.

Step S502

The CPU 109 reads the white image $W_{(N)}$ obtained in a previous calibration from the memory 113, divides a white image candidate $W_{((N-1)*sum+n)}$ by the white image $W_{(N)}$, and stores a resulting image $W''$ $(=W_{((N-1)*sum+n)}/W_{(N)})$ in the memory 112.

The purpose of the division is to roughly correct gain variations in the digital radiation detector 107 (gain variations across pixels of the image pickup device), and to increase examination accuracy. An image fault examination is performed after removing gain variations in the digital radiation detector 107. Step S502 is performed for the following two reasons. 1) Gain variations in the digital radiation detector 107 typically range from several percent to tens of percent; on the other hand, variations to be examined in the examination to be discussed is on the order of several percent. 2) Although the gain variations in the digital radiation detector 107 vary slightly depending on imaging conditions and ambient temperature, the magnitude thereof is generally constant. For the reasons 1) and 2), the gain variations in the digital radiation detector 107 are roughly corrected by dividing the current white image candidate $W_{((N-1)*sum+n)}$ by the previous white image $W_{(N)}$, and the image fault examination is performed to increase the imaging accuracy. In the third embodiment, the white image candidate $W_{((N-1)*sum+n)}$ is divided by the white image $W_{(N)}$. Alternatively, a difference between the white image $W_{(N)}$ and the white image candidate $W_{((N-1)*sum+n)}$ may be employed.

The reason why the white image candidate $W_{((N-1)*sum+n)}$ is divided by the white image $W_{(N)}$ obtained in the previous calibration imaging is as follows. The user must regularly calibrate the imaging system to keep it in a satisfactory operating condition. The calibration is intended to correct chronological change in sensor gain variations and to avoid correction fault due to a change in the operational conditions. In the third embodiment, a previous white image is used to determine a new calibration for a fitness test. If the apparatus is used daily, a yesterday's white image is used to test the today's calibration, and a today's white image will be used to test a tomorrow's calibration. In a preferred embodiment, the latest (previous) white image $W_{(N)}$ from among regularly obtained white images $W_{(N)}$ is used. The present invention is not limited to this. The white image $W_{(N)}$ may be updated regularly or at any time at the user prefers, or on a non-regular basis.

Step S503

The CPU 109 performs the irradiation field test. The irradiation field test is performed on the area set in step S401, with the remaining area excluded as a test area.

The white image, which results during the calibration when the imaging area of the digital radiation detector 107 (the photosensitive surface of the image pickup device) is not entirely irradiated, cannot perform a correct gain correction process on the pixels outside the irradiated area thereof.

The CPU 109 subtracts pixels on both sides of, and immediately above and below, a pixel W'' of interest stored in the memory 112 from the pixel W'' of interest to form a two-dimensional differential image. The CPU 109 binarizes the differential image, thereby determining an edge of change in radiation dose.

The CPU 109 determines from the edge detection result whether the irradiation field is appropriate. When the CPU 109 determines that the irradiation field is not appropriate (i.e., the calibration area is not entirely irradiated), the CPU 109 determines that the irradiation field has failed to pass the irradiation field test. When the CPU 109 determines that the irradiation field is appropriate (i.e., the calibration area is entirely irradiated), the CPU 109 determines that the irradiation field has passed the irradiation field test. The method for testing the irradiation field is discussed by way of example only, and the present invention is not limited to this method.

Step S504

The CPU 109 inspects the presence or absence of a foreign object.

The calibration imaging can be performed with a foreign object included. If the subject 105 is imaged with that foreign object removed, and if the radiation image is then subjected to the gain correction process using the white image with the foreign object included, gain can be excessively raised at the location of the foreign object. The foreign object test is thus performed to avoid the inclusion of the foreign object in the radiation image after the gain correction process. The foreign object may be dust, remnants of imaging agents, or handwriting with a pencil core. The area to be tested is the area set in step S401, and the remaining area outside the set area is excluded from the test area.

In step S504, the CPU 109 divides the image W" stored in the memory 112 into tiny segments of 100 pixels by 100 pixels, and then determines the mean pixel values Eij and the standard deviation Sij for each segment. Here, "ij" represent the coordinates of each segment.

The CPU 109 determines from the obtained mean pixel values Eij and the obtained standard deviations Sij whether a foreign object is included.

Specifically, a mean value E of surrounding segments of a segment ij having a mean value of Eij (here eight segments) is determined by equation (1).

$$E = \left\{ \sum_{x=i-1}^{i+1} \sum_{y=j-1}^{j+1} E_{xy} - E_{ij} \right\} / 8 \quad (1)$$

The mean value E is compared with Eij. A mean value S of standard deviations of surrounding segments of a segment ij having a standard deviation Sij (here eight segments) is determined by equation (2).

$$S = \left\{ \sum_{x=i-1}^{i+1} \sum_{y=j-1}^{j+1} S_{xy} - S_{ij} \right\} / 8 \quad (2)$$

The mean value S of the standard deviations is compared with the standard deviation Sij. These comparison results indicate whether the mean value Eij and the standard deviation Sij vary, and therefore determines whether a foreign object is included. For example, the mean value Eij indicating a variation of 1% or more with respect to the mean value E determines that a foreign object is present. The standard deviation Sij indicating a variation of three times as large as or larger than that in the mean value S of the standard deviations determines that a foreign object is present.

The determination criteria (a variation of 1% or more and three times as large as or larger than) are dependent on the S/N ratio of the radiation imaging apparatus 100.

When it is determined that a foreign object is present, the CPU 109 determines that the white image has failed to pass the foreign object test. When it is determined that no foreign object is present, the CPU 109 determines that the white image has passed the foreign object test.

Step S505

The CPU 109 performs a grid test.

The inclusion of the mesh of the grid in imaging occurs when grid motion control is not correctly performed or when synchronization with irradiation timing is not correctly established. Since the frequency of the grid is known, the CPU 109 applies a Fourier transform on the image W" stored in the memory 112 in a direction perpendicular to the grid, and examines the frequency spectrum corresponding to the grid. Thus, the grid test is easily performed. The area to be tested is the area set in step S401, and the remaining area outside the set area is excluded from the test area.

The CPU 109 determines whether the spectrum value of the frequency region of the grid exceeds a predetermined threshold. For example, the predetermined threshold is set to be twice as high as a noise spectrum level.

When it is determined that the spectrum value of the frequency region of the grid exceeds the predetermined threshold, the CPU 109 determines that the grid has failed to pass the grid test. When it is determined that the spectrum value of the frequency region of the grid is not higher than the predetermined threshold, the CPU 109 determines that the grid has passed the grid test.

Step S506

The CPU 109 performs the line noise test.

External noise, if added to a driver power supply circuit, causes noise streaks aligned in the same direction to appear in an image in the image pickup device used in the digital radiation detector 107, although the level of the noise depends on the driving method of the image pickup device. This is because data transfer is performed concurrently horizontally or vertically on a column by column basis. The external noise refers to electrical noise coming from an alternating current power supply or a ground line, or electromagnetic radiation noise. The area to be tested is the area set in step S401, and the remaining area outside the set area is excluded from the test area.

The CPU 109 performs the line noise test, by dividing a certain area of the image W" stored in the memory 112 into segments, and examines the direction of generation of a noise streak on a segment by segment basis, and the projection data of the noise streak with respect to a vertical direction. The CPU 109 compares the standard deviation of the projected data with a predetermined permissible value for the apparatus. The segmentation of the certain area of the image W" is performed to detect localized noise streaks or to avoid examination accuracy drop attributed to entire shading of the image. The above examination may be performed on an entire area of interest. A frequency analysis using a Fourier transform may be performed.

When the standard deviation of the projection data exceeds the permissible value of the apparatus, the CPU 109 determines the line noise has failed to pass the line noise test. When the standard deviation of the projection data is equal to or less than the permissible value of the apparatus, the CPU 109 determines that the line noise has passed the line noise test.

Step S507

The CPU 109 performs the abnormal bit test.

An abnormal bit occurs when a pixel defect takes place in the digital radiation detector 107 or when a digital data transfer error is created. When the entire system operates normally, the image W" becomes a substantially uniform image. By examining a difference between the output of each pixel and the mean value of the outputs of all pixels, the generation of an abnormal bit is easily detected. The area to be tested is the area set in step S401, and the remaining area outside the set area is excluded from the test area.

The CPU 109 divides a certain area of the image W" stored in the memory 112 into segments, and calculates the mean and the standard deviation of the pixels at each segment. The CPU 109 determines whether the difference between the value of each pixel in each segment and the mean value exceeds five times the standard deviation. If the criterion of five times is lowered, the detection rate of an abnormal pixel rises while the possibility of erroneously detecting a normal pixel as an erratic pixel increases. Conversely, if the criterion of five times is raised, the possibility of erroneously detecting a normal pixel as an erratic pixel is lowered while the detection rate of an abnormal bit drops. On the assumption that an erroneous detection occurs with a certain probability, a determination criterion may be defined by the number of detected abnormal bits to the number of all pixels.

When abnormality is found, the CPU 109 determines that the abnormal bit test is a failure. When abnormality is not found, the CPU 109 determines that the abnormal bit test is a success.

Step S411

The CPU 109 references each of the results from steps S501, S503, S504, S505, S506, and S507, and then determines the following step. If the test results from steps S501, S503, S504, S505, S506, and S507 prove successful, the CPU 109 performs step S412. When at least one of the steps S501, S503, S504, S505, S506, and S507 is not successful, the algorithm branches to step S421.

Step S412

The CPU 109 adds the calibration white image $W_{((N-1)sum+n)}$ to the white image $W_{(N)}$ prior to normalization stored in the memory 112 and substitutes the result for the white image $W_{(N)}$ ($W(N)=W_{(N)}+W_{((N-1)*sum+n)}$).

Step S413

The CPU 109 displays, through the display function of the operation unit 116, a message indicating that the n-th calibration with the N-th dose level has been normally completed.

Step S414 and Step S415

The CPU 109 adds "1" to the counter n (step S414), and determines whether the updated count exceeds the imaging count sum designated by the user.

When the determination result is not n>sum, the CPU 109 returns to step S408 to start over. When the determination result is n>sum, the CPU 109 continues at step S416 (step S415).

Step S416

When the determination result in step 415 is n>sum, in other words, when the calibration count desired by the user is completed, the CPU 109 divides the white image $W'_{(N)}$ stored in the memory 112 by a mean pixel value (Wmean) of the white image $W'_{(N)}$ for normalization, acquiring the image $W_{(N)}$ (=$W'_{(N)}$/Wmean). The image $W_{(N)}$ is stored in the memory 113 as a white image to be used for the gain correction process.

Steps S417 and S418

The CPU 109 adds "1" to the counter N (step S417), and determines whether the count N exceeds the imaging count sum designated by the user.

When it is not N>cal_no, the CPU 109 returns to step S408 to start over. When it is N>cal_no, the CPU 109 continues at step S419 (step S418).

Step S419

The CPU 109 displays, through the display function of the operation unit 116, a message indicating that the calibration plan displayed in step S405 has been successfully completed.

Step S420

Subsequent to step S419 or when the user selects "Exit calibration" in the above-mentioned step S408, the CPU 109 displays through the display function of the operation unit 116 a message indicating that calibration has ended.

The radiation imaging apparatus 100 now exits the calibration mode, and is ready for normal imaging (for the subject 105).

The white image $W_{(N)}$ stored in the memory 112 is not updated when the radiation imaging apparatus 100 exits as a result of an aborted calibration.

Step S421

When any one of determination results in steps S501, S503, S504, S505, S506, and S507 is abnormal, the CPU 109 displays the abnormal test result through the display function of the operation unit 116.

For example, as shown in FIG. 9, the CPU 109 displays a message indicating that calibration has failed. A test result display 607 lists which test has failed and which test has succeeded. To let the user know the progress of calibration until the test failure, the screen displays the dose level at the failure of the dose level test at the dose level display 605 and the imaging count at the time of failure at the imaging count display 606.

The CPU 109 starts over with step S408. In this way, the user is asked whether or not to start the calibration again.

The count n of the counter is not updated, and an n-th calibration is again performed.

Using the white images $W_{(1)}$, $W_{(2)}$, ..., $W_{(N)}$ created through the above-referenced calibration process, the gain correction is performed in the clinical imaging. In the white image formation process in the above embodiments, each of white images resulting from a plurality of calibrations is examined in terms of fitness as a white image to be used for the gain correction process regardless of whether an imaging fault suddenly takes place. For example, if ten white images are obtained from ten calibrations with one of the ten images at fault, the image fault is averaged to one-tenth, but the image fault may migrate to the normal nine images. In accordance with the above embodiments, however, the fitness determination is carried out for all white images one by one. The appropriate white image is always used for the gain correction process for the radiation imaging thereafter (for the subject 105). The properly gain-corrected image is thus reliably obtained. Since the calibration count is selected by the user himself, the user can adjust the calibration count in a balanced manner in consideration of other jobs.

A storage medium storing program codes of the software program for performing the functions of a host computer or mobile terminal of the first, second and third embodiments is supplied to a system or an apparatus, and the computer (CPU or MPU) of the system or the apparatus reads the program codes to carry out the program.

The program code read from the storage medium performs the function of the first and second embodiments. The storage medium storing the program codes falls within the scope of the present invention.

Available as storage media for providing the program code are a ROM, a floppy disk, a hard disk, an optical disk, a magnetooptical disk, a CD-ROM, a CD-R, a magnetic tape, a non-volatile memory card, and the like.

The computer executes the supplied software program, thereby performing the functions of the first, second and third embodiments. Furthermore, the program codes perform the functions of the first, second, and third embodiments in cooperation with the OS (Operating System) running on the computer. Such program codes fall within the scope of the present invention.

The supplied program codes are written on a function expansion board inserted into the computer or a memory provided on an function expansion unit connected to the computer. A CPU on the expansion board or function expansion unit partly or entirely performs the process. The functions of the first, second, and third embodiments are thus performed. Such a system also falls within the scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A radiographic image capturing apparatus with a function of generating gain data for gain correction of image pickup devices, comprising:
   a radioactive ray generator, adapted to radiate a radioactive ray;
   an image unit, which is composed of the image pickup devices, adapted to transform the radioactive ray into image data;
   memory, arranged to store first gain data;
   a determination unit, adapted to determine whether the image data for the gain data satisfies criteria of the gain data or not;
   a generation unit adapted to generate second gain data from image data for the gain data if the image data satisfies the criteria; and
   a gain correction unit adapted to correct gain of the image data by utilizing the second gain data, wherein the determination unit makes its determination based on the first gain data.

2. A radiographic image capturing apparatus according to claim 1, wherein the image data for the gain data is captured by the image unit without any shields against the radioactive ray.

3. A radiographic image capturing apparatus according to claim 1, wherein the generation unit generates the second gain data by normalization of the image data for the gain data.

4. A radiographic image capturing apparatus according to claim 1, wherein the determination unit determines the satisfaction of the criteria when the dispersion of the image data, which is obtained by dividing the image data or the gain data by the first gain data, is lower than a predetermined value.

5. A radiographic image capturing apparatus according to claim 1, wherein the determination unit determines the satisfaction of the criteria when the variance value of the image data, which is obtained by dividing the image for the gain data by the first gain data, is lower than a predetermined value.

6. A radiographic image capturing apparatus according to claim 1, wherein the determination unit also determines the satisfaction on the criteria when the average value of the image data for the gain data is within the limits of a predetermined value.

7. A radiographic image capturing apparatus according to claim 1, wherein the determination unit makes its determination based on the data in the specific range of the image data for the gain data.

8. A radiographic image capturing apparatus according to claim 1, wherein the generation unit generates the second gain data based on a plurality of the image data for the gain data.

9. A radiographic image capturing apparatus according to claim 1, further comprising:
   a warning unit adapted to give a warning when the data do not satisfy the criteria.

* * * * *

UNITED STATES PATENT AND TRADEMARK OFFICE
CERTIFICATE OF CORRECTION

PATENT NO.   : 6,819,786 B2
DATED        : November 16, 2004
INVENTOR(S)  : Akira Hirai It is certified that error appears in the above-identified patent and that said Letters Patent is hereby corrected as shown below:

<u>Column 22,</u>
Line 16, "on" should read -- of --.

Signed and Sealed this

Fifth Day of April, 2005

JON W. DUDAS
*Director of the United States Patent and Trademark Office*